(12) United States Patent
Bendak et al.

(10) Patent No.: US 6,931,006 B1
(45) Date of Patent: Aug. 16, 2005

(54) SYSTEM AND METHOD FOR SELECTIVELY BROADCASTING A MULTIDIMENSIONAL DIGITAL FRAME STRUCTURE

(75) Inventors: George Beshara Bendak, San Diego, CA (US); Alan Michael Sorgi, San Diego, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 689 days.

(21) Appl. No.: 09/745,793

(22) Filed: Dec. 22, 2000

(51) Int. Cl.$^7$ ............................................. H04L 12/28
(52) U.S. Cl. ..................................... 370/390; 370/474
(58) Field of Search ........................ 370/351, 389–393, 370/400–411, 458, 469, 474–476, 503–515

(56) References Cited

U.S. PATENT DOCUMENTS

| | | | |
|---|---|---|---|
| 4,882,683 A * | 11/1989 | Rupp et al. ................. 345/568 |
| 5,251,205 A | 10/1993 | Callon et al. |
| 5,490,252 A | 2/1996 | Macera et al. |
| 5,553,068 A | 9/1996 | Aso et al. |
| 5,568,471 A | 10/1996 | Hershey et al. |
| 5,600,648 A * | 2/1997 | Furuta et al. ................ 370/248 |
| 5,661,763 A | 8/1997 | Sands |
| 5,666,108 A | 9/1997 | Duffy |
| 5,778,000 A | 7/1998 | Dosiere et al. |
| 5,793,976 A | 8/1998 | Chen et al. |
| 5,854,699 A | 12/1998 | Olshansky |
| 5,875,396 A | 2/1999 | Stockton et al. |
| 5,982,743 A | 11/1999 | Kusano |
| 6,006,069 A | 12/1999 | Langston |
| 6,018,406 A * | 1/2000 | Ishimatsu et al. ........... 398/181 |
| 6,493,847 B1 * | 12/2002 | Sorgi et al. .................. 714/800 |
| 6,496,477 B1 * | 12/2002 | Perkins et al. ............... 370/228 |
| 6,577,630 B1 * | 6/2003 | Markwalter et al. ........ 370/392 |
| 6,684,351 B1 * | 1/2004 | Bendak et al. ............... 714/715 |
| 6,715,113 B1 * | 3/2004 | Bendak et al. ............... 714/708 |
| 6,836,485 B1 * | 12/2004 | Bendak et al. ............... 370/509 |
| 6,847,657 B1 * | 1/2005 | Bendak et al. ............... 370/509 |
| 2005/0030932 A1 * | 2/2005 | Kelly et al. .................. 370/345 |

FOREIGN PATENT DOCUMENTS

JP         05276153         * 10/1993

* cited by examiner

*Primary Examiner*—David Vincent
(74) *Attorney, Agent, or Firm*—INCAPLAW; Terrance A. Meador

(57) ABSTRACT

A system and method have been provided for programming synchronization features of a multidimensional digital frame structure. Such a frame structure acts as a digital wrapper and includes overhead, payload, and forward error correction (FEC) sections. Words in the overhead section are used to selectively synchronize the broadcast frame structure at a plurality of network nodes. The described invention permits the frame synchronization bytes (FSBs) to be made programmable, so that the system and method are flexible for changes in communication protocols, as well for the selective exclusion of nodes. This flexibility also impacts the number, the location, bandwidth, and the bit error rate (BER) of the located FSBs.

23 Claims, 10 Drawing Sheets

SYSTEM AND METHOD FOR SELECTIVELY BROADCASTING A MULTIDIMENSIONAL DIGITAL FRAME STRUCTURE

RELATED APPLICATIONS

This application contains material related to the following commonly assigned U.S. patent applications incorporated herein by reference:

Ser. No. 09/746,152 filed 22 Dec. 2000 for "SYSTEM AND METHOD FOR PROGRAMMING THE QUANTITY OF FRAME SYNCHRONIZATION WORDS IN A MULTIDIMENSIONAL DIGITAL FRAME STRUCTURE"

Ser. No. 09/746,490 filed 22 Dec. 2000 for "SYSTEM AND METHOD FOR PROGRAMMING THE LOCATION OF FRAME SYNCHRONIZATION WORDS IN A MULTIDIMENSIONAL DIGITAL FRAME STRUCTURE"

Ser. No. 09/745,655 filed 22 Dec. 2000 for "SYSTEM AND METHOD FOR PROGRAMMING THE VALUE OF FRAME SYNCHRONIZATION WORDS IN A MULTIDIMENSIONAL DIGITAL FRAME STRUCTURE"

Ser. No. 09/747,380 filed 22 Dec. 2000 for "SYSTEM AND METHOD FOR PROGRAMMING THE BIT ERROR RATE OF FRAME SYNCHRONIZATION WORDS IN A MULTIDIMENSIONAL DIGITAL FRAME STRUCTURE"

Ser. No. 09/745,744 filed 22 Dec. 2000 for "SYSTEM AND METHOD FOR PROGRAMMING SYNCHRONIZATION CRITERIA IN A MULTIDIMENSIONAL DIGITAL FRAME STRUCTURE"

Ser. No. 09/747,072 filed 22 Dec. 2000 for "SYSTEM AND METHOD FOR PROGRAMMING LOSS OF SYNCHRONIZATION IN A MULTIDIMENSIONAL DIGITAL FRAME STRUCTURE"

Ser. No. 09/746,159 filed 22 Dec. 2000 for "SYSTEM AND METHOD FOR TRANSLATING OVERHEAD BYTES IN A MULTIDIMENSIONAL DIGITAL FRAME STRUCTURE"

Ser. No. 09/527,343, filed 17 Mar. 2000 for "TRANSPOSABLE FRAME SYNCHRONIZATION STRUCTURE"

Ser. No. 09/528,021, filed 17 Mar. 2000 for "PROGRAMMABLE SYNCHRONIZATION STRUCTURE WITH AUXILIARY DATA LINK"

BACKGROUND OF THE INVENTION

1. Field of the Invention

This invention generally relates to information communicated in a digital wrapper and, more particularly, to a system and method for programming of frame synchronization words for the purposes of selectively broadcasting the communication frame structure.

2. Description of the Related Art

Frame synchronization is used in most communication's technologies where extra bandwidth is required to add functionality into the original data stream. There is no standard practice with respect to the bandwidth allocation of frame synchronization words. Neither is there an ability to customize the bandwidth and synchronization thresholding, adaptive to various bit error rate conditions in a variable rate forward error correction (FEC) system implementing an interleaved multi-frame superframe.

It would increase information bandwidth if all the bytes, or words of a digital frame structure could be devoted to payload. However a significant portion of the frame is devoted to FEC to remove errors that are introduced in data transmission lines. Even fiber optic systems can be noisy enough to introduce errors, when the distance between nodes is great enough. Part of the frame must also be used for maintenance functions between communication nodes. Further, a portion of the frame must be devoted to synchronization. The synchronization function becomes even more critical when the frames are scrambled to randomize the data density. These maintenance and synchronization bytes reside in the overhead section of the frame. However, as mentioned above, there is no standard protocol defining the number, location, or value of frame synchronization bytes.

It would be advantageous if communication hardware could be developed that permitted flexibility in defining the frame synchronization bytes, so as to permit the hardware to be used in a number of communication protocols.

It would be advantageous if communications could be broadcast to an entire network, but only received at a selected group of nodes by using different synchronization schemes.

It would be advantageous if some nodes could be selectively excluded from communications that are broadcast to a network of nodes.

It would be advantageous if nodes could be selectively excluded from network communications by controlling synchronization parameters.

It would be advantageous if the value of frame synchronization bytes (FSBs) could be made selectable in a multidimensional digital frame structure for use in controlling the synchronization patterns.

Likewise, it would be advantageous if the quantity, location, and bit error rates of the FSBs could be made selectable to accommodate a number of communication standards, or changes to existing standards.

SUMMARY OF THE INVENTION

Accordingly, an integrated circuit communication device is provided that includes programmable features to allocate bandwidth for frame synchronization words and set up the error thresholding, adjusting the robustness to bit errors and the time required to achieve synchronization. More specifically, the device provides for a programmable frame synchronization word bandwidth;

programmable frame synchronization words;

different synchronization words with independent allocated bandwidths;

frame synchronization word translation between the decoder and encoder;

frame synchronization word error thresholding for system robustness;

programmable synchronization (in-to-sync) parameters; and programmable out-of-sync synchronization parameters.

Broadly, this invention describes a structure for programming key features in a frame synchronization system using a multidimensional digital frame. More particularly, an example of the invention is provided in a programmable framing structure for a forward error correction (FEC) encoded channel interleaved to 16 levels with a 4 frame superframe. The structure provides the user the ability to allocate the amount of bandwidth dedicated to the frame synchronization words, to control the speed of synchronization and the robustness to channel noise. As an added benefit, a programmable synchronization threshold can be set to even further increase the robustness to channel noise and to decrease the synchronization time under high bit error rate conditions. These techniques together allow users to increase network security and partitioning as well as to dynamically reallocate the bandwidth occupied for framing based on link conditions without corrupting user data.

Details of the programmable communication IC and a method for variably programming frame synchronization structure in a multidimensional digital frame structure are provided below.

BRIEF DESCRIPTION OF THE DRAWING

FIG. 4 is an example of node identifiers differentiated by the quantity of FSBs in the broadcast frame overhead section.

FIG. 5 is an example of node identifiers differentiated by the location of FSBs in the broadcast frame overhead section.

DETAILED DESCRIPTION OF THE PREFERRED EMBODIMENTS

Figure 1:
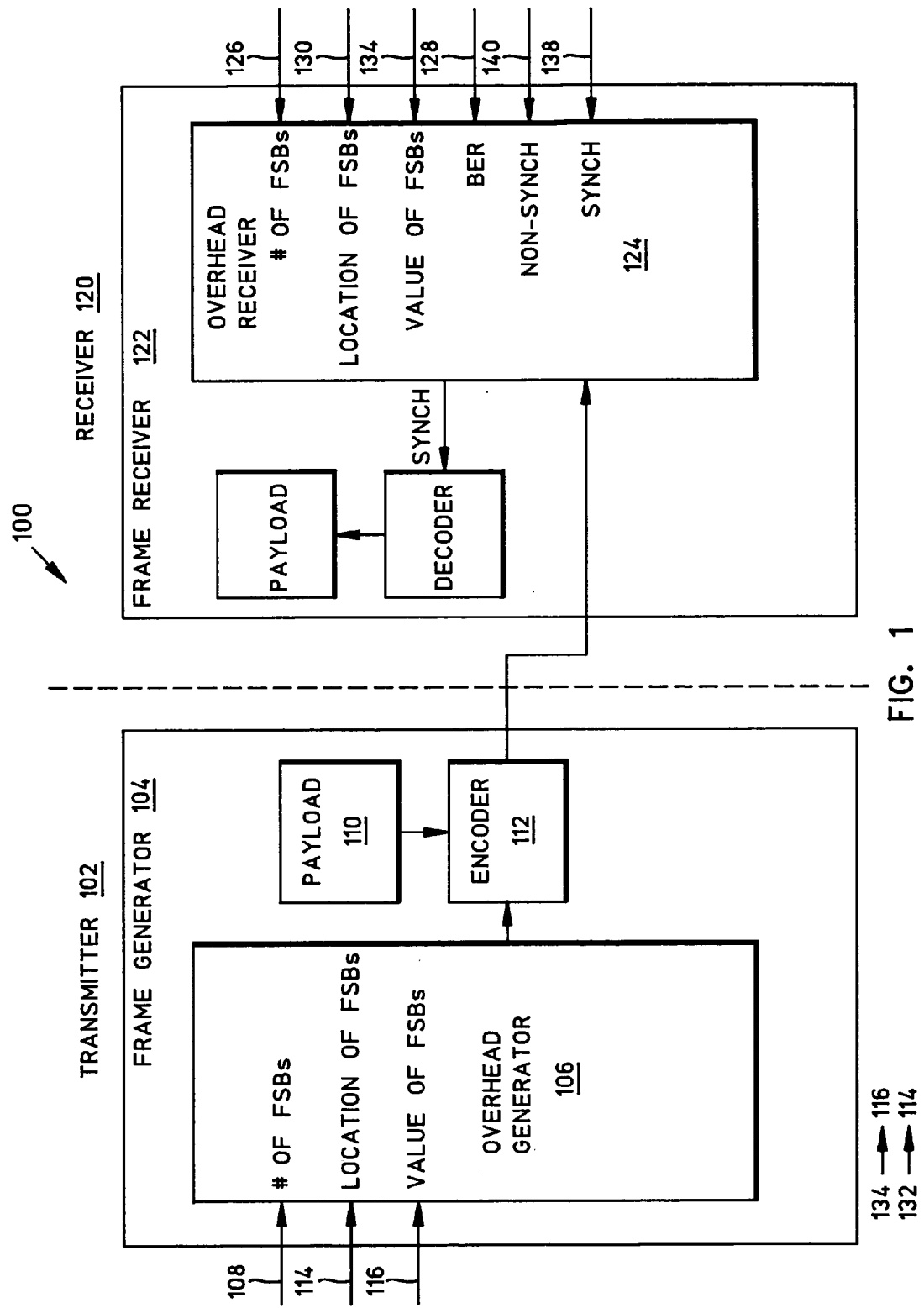
FIG. 1 is a schematic block diagram of a system for variably programming frame synchronization in the communication of a multidimensional digital frame structure.

FIG. 1 is a schematic block diagram of a system for variably programming frame synchronization in the communication of a multidimensional digital frame structure. The system 100 comprises a transmitter 102 with a frame generator 104. The frame generator 104 includes an overhead generator 106 having an input to accept commands on line 108 for selecting the number of synchronization bytes in the overhead section of a frame. A payload generator 110 supplies the information that is to be transmitted. The information can be generated at the transmitter 102, or it can be the payload of a previously received frame. In this case, the transmitter 102 would be acting as a relay. The frame generator 104 also includes an FEC section, or encoder 112. The encoder codes the payload so that errors due to degradation can be removed at the destination. In some aspects of the invention, parts of the overhead section, or the entire overhead section is encoded, along with the payload. Commands to select FSB locations are accepted on line 114, and commands to select FSB values are accepted on line 116.

Figure 2:
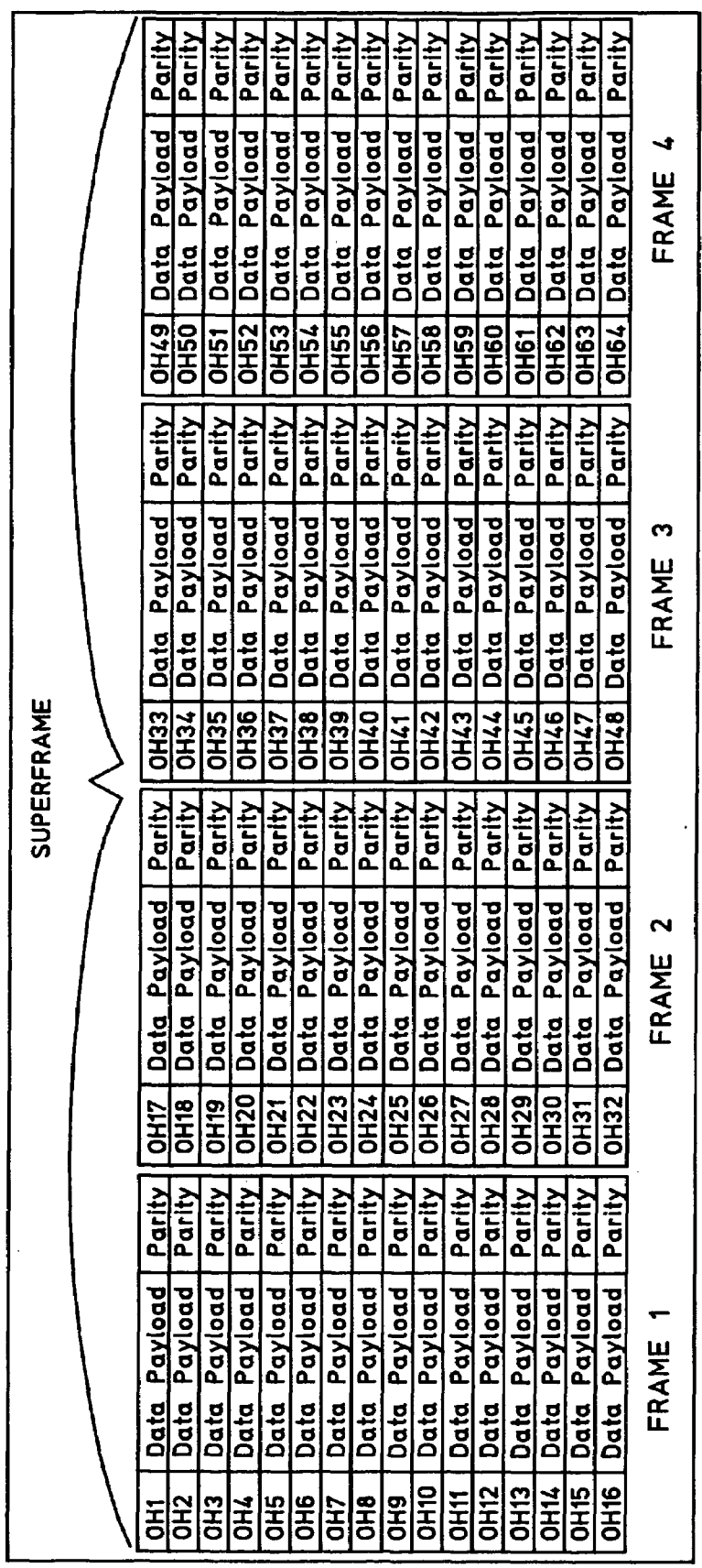
FIG. 2 is a diagram illustrating a multidimensional digital frame structure.

FIG. 2 is a diagram illustrating a multidimensional digital frame structure. As can be seen from examining Frame 1, each frame is considered to be multidimensional because it includes a plurality of rows, where each row includes an overhead byte, payload bytes, and parity (FEC) bytes. The present invention is not limited to any particular number of bytes to the overhead, payload, and FEC sections, or to any particular number of rows.

Returning to FIG. 1, the system 100 includes a receiver 120 with a frame receiver 122. The frame receiver 122 includes an overhead receiver 124 with an input on line 126 to accept commands for selecting the number of frame synchronization bytes for synchronizing the received frame. The overhead receiver 124 synchronizes the frame in response to recognizing the selected frame synchronization bytes. In other aspects of the invention, the frame synchronization function is performed by other elements of the receiver 120 (not shown). Once the FSBs have been identified, synchronization is possible. The frame can be decoded and the payload identified. In some aspects of the invention, the receiver 120 is part of a relay, and the payload is relayed as is, or modified before it is retransmitted. Commands to accept FSB bit error rates are accepted on line 128, commands to accept FSB locations are accepted on line 130, and commands to accept FSB values are accepted on line 134.

The overhead generator 106 has an input(s) to accept commands for selecting the node identifiers for insertion into broadcast frame overhead sections. The system includes at least one receiver 120 with a frame receiver 122. The overhead receiver 124 has an input(s) to accept commands for selecting node identifiers. The overhead receiver 124 synchronizes the broadcast frame in response to acknowledging the node identifier.

For example, the overhead generator 106 selects a first node identifier for the broadcast frame, and a first overhead receiver 124 acknowledges the first node identifier, and synchronizes the broadcast frame in response to acknowledging the first node identifier.

Figure 3A:
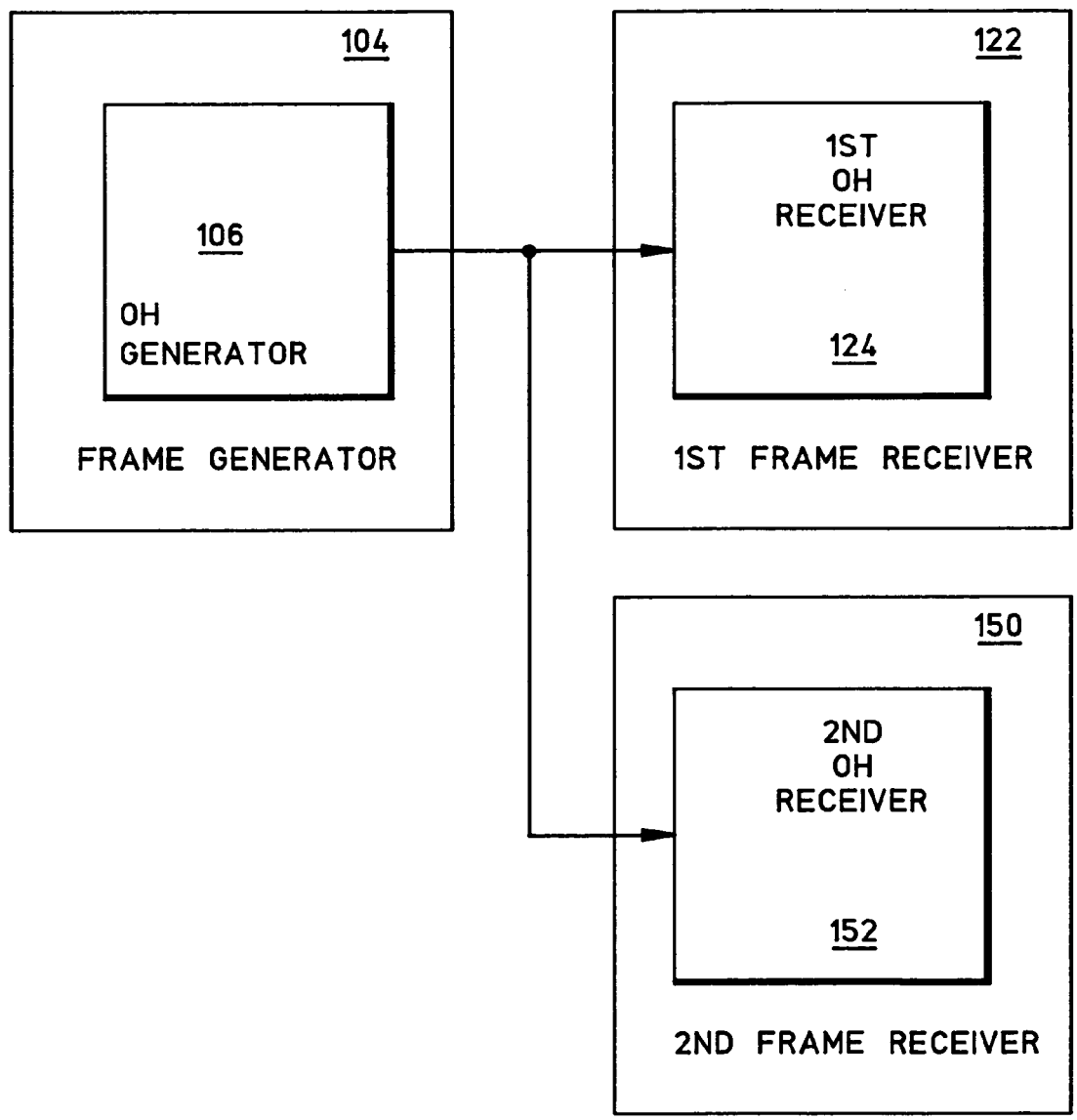
FIGS. 3a and 3b are schematic block diagrams illustrating the invention of FIG. 1 with an additional receiver.
Figure 3B:
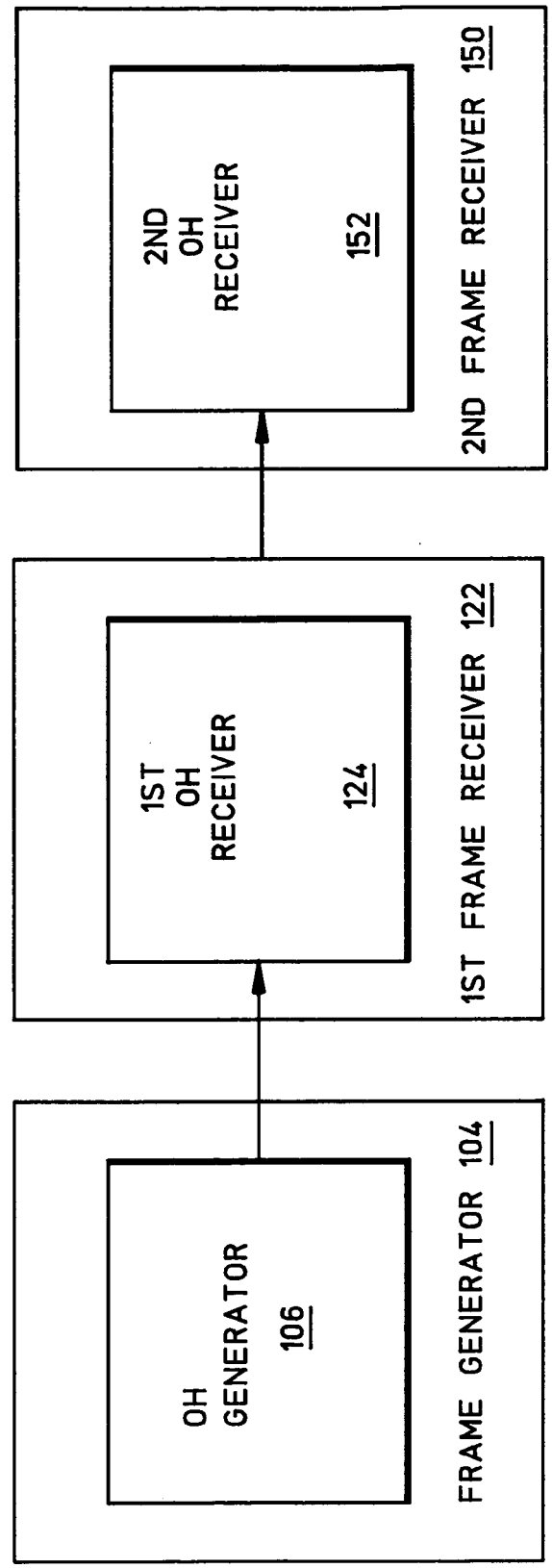

FIGS. 3a and 3b are schematic block diagrams illustrating the invention of FIG. 1 with an additional receiver. A second receiver 150 is included, similar to the first receiver 120. The second receiver 150 includes a second overhead receiver 152. In one aspect of the invention, the second overhead receiver 152 acknowledges the first node identifier, and synchronizes the broadcast frame, along with the first overhead receiver 124, in response to acknowledging the first node identifier. In another aspect, the second overhead receiver 152 acknowledges a second node identifier, but does not synchronize the broadcast frame in response to acknowledging the second node identifier. As explained below, the node identifier is a pattern of FSBs. If the overhead generator 106 selects a pattern of FSBs which the second overhead receiver cannot synchronize to, the broadcast message is not received at the second overhead receiver (second node) 152.

In some aspects of the invention, the overhead generator 106 selects a first node identifier and a second node identifier for the broadcast frame. As above, the first overhead receiver synchronizes the broadcast message in response to selecting the first node identifier. In this scenario the second overhead receiver 152 acknowledges the second node identifier, and synchronizes the broadcast frame in response to acknowledging the second node identifier.

Returning to FIG. 1, the overhead generator 106 includes an input to select node identifiers for insertion into the overhead section. The frame generator 104 defines a frame having an overhead section with a first plurality of overhead section bytes. Therefore, the overhead generator 106 selects frame synchronization bytes for insertion into the broadcast frame overhead section, where node identifiers are selected in response to the frame synchronization bytes. Thus, the overhead generator 106 can select a plurality of node identifiers from a plurality of frame synchronization bytes.

More specifically, the overhead generator 106 selects frame synchronization byte groups associated with node identifiers. For example, when the payload generator 110 generates a message intended for a first node 124, the overhead generator 106 selects the first node identifier and inserts the frame synchronization bytes associated with the first node into the broadcast frame overhead section.

When, the payload generator 106 generates a message addressed to a first and a second node 124/152, the overhead generator 106 selects the first and second node identifiers. The overhead generator inserts the frame synchronization bytes associated with the first and second node identifiers into the broadcast frame overhead section. However, as noted above it is possible for more than one node to use the same identifier. In the scenario, a single node identifier can be selected by the overhead generator to communicate with a plurality of nodes.

There are a number of ways to generate the plurality of node identifiers required for selective broadcast. In one aspect of the invention, the overhead generator 106 selects the quantity of frame synchronization bytes in the overhead section, where node identifiers are associated with frame synchronization byte groups that are differentiated by number (quantity). The overhead generator 106 selects the number of frame synchronization bytes in the range from zero to the first plurality.

Figure 4:
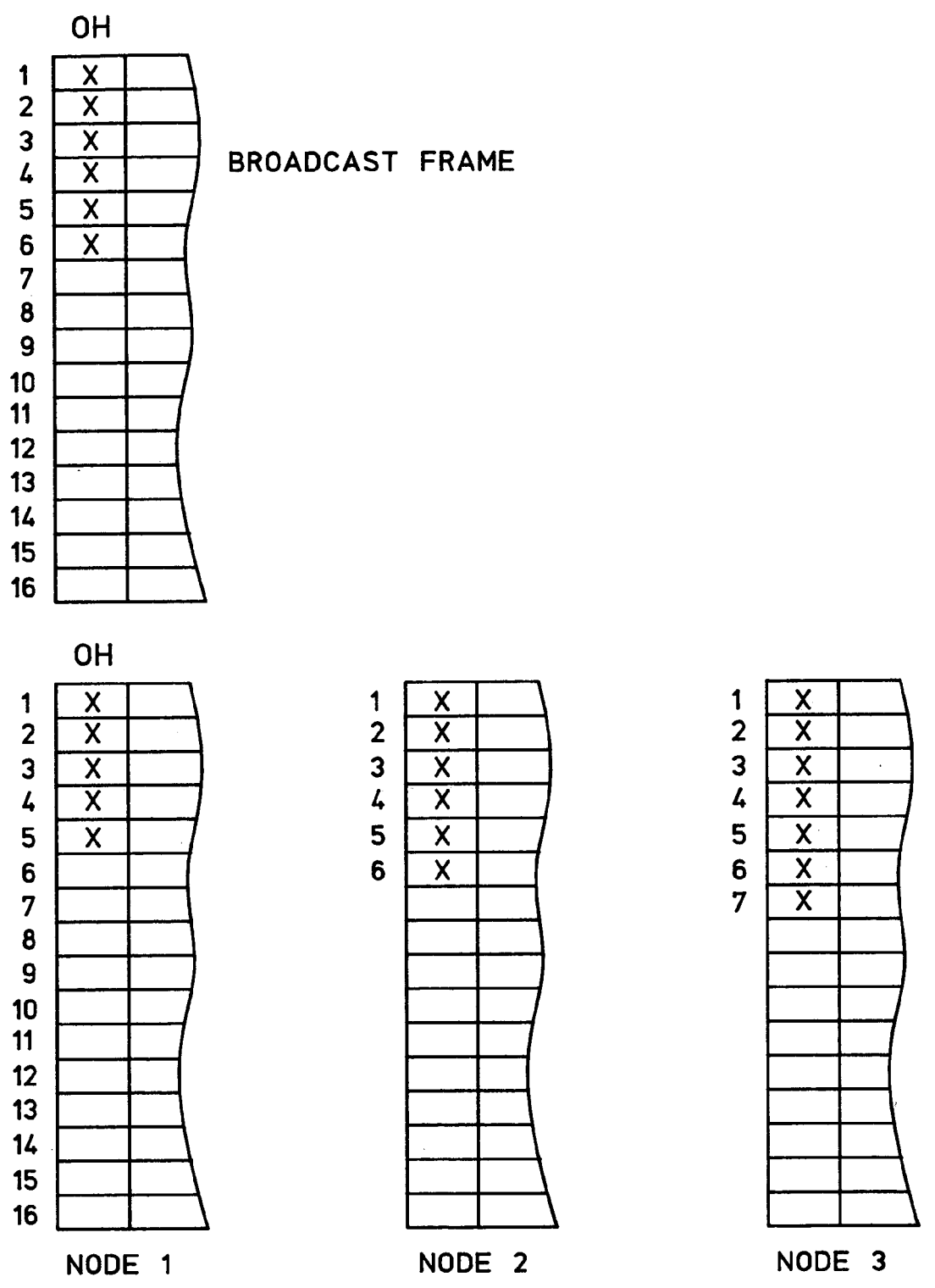

FIG. 4 is an example of node identifiers differentiated by the quantity of FSBs in the broadcast frame overhead section. A frame is broadcast with six FSBs in the overhead section. At node one, five FSB bytes are selected. Because the broadcast frame overhead section includes five FSB bytes, the frame is synchronized. At node two, six FSBs have been selected. Because the broadcast frame overhead section includes six FSBs, the frame is also synchronized at node two. Thus, the frame can be considered to have been broadcast with both first and second node identifiers, where the first node identifier is associated with node one and the second node identifier with node 2. However, node three has selected seven FSB and the broadcast frame is not synchronized at node three.

In some aspects of the invention, the overhead generator 106 selects the location of frame synchronization bytes in the overhead section, where node identifiers are associated with frame synchronization byte groups that are differentiated by byte location. The overhead generator 106 selects frame synchronization byte locations in the range from zero to a first plurality of locations. As shown is FIG. 2, the first plurality equals sixteen in some aspects of the invention.

Figure 5:
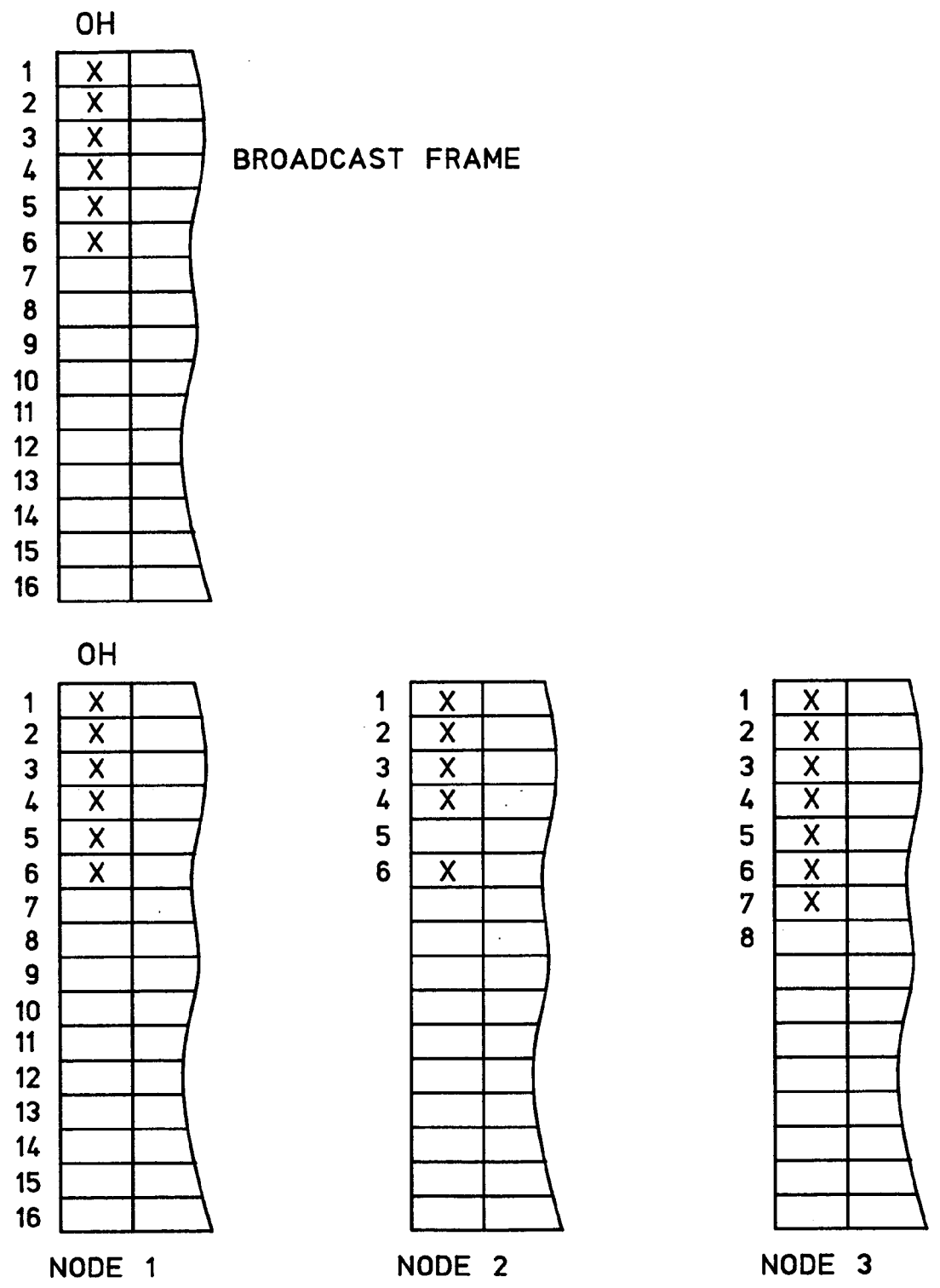

FIG. 5 is an example of node identifiers differentiated by the location of FSBs in the broadcast frame overhead section. A frame is broadcast with FSBs is the first six overhead byte locations. At node 1, the first six byte locations are also selected, and the frame is synchronized. At node two, five FSB byte locations, one through four, and six are selected. Because the broadcast frame overhead section includes FSB bytes in all the above-mentioned locations, the frame is synchronized at node two. Again, the frame can be considered to have been broadcast with both first and second node identifiers, where the first node identifier is associated with node one and the second node identifier with node two. However, node three has selected FSBs in the first seven locations. Because the broadcast frame does not have an FSB at location seven, the frame is not synchronized at node three.

In some aspects of the invention, the overhead generator 106 selects the value of frame synchronization bytes in the overhead section, where node identifiers are associated with frame synchronization byte groups that are differentiated by byte value. The overhead generator 106 selects a second plurality of bits for each frame synchronization byte, where each byte includes a second plurality of bits. Typically, there are eight bits per byte.

Figure 6:
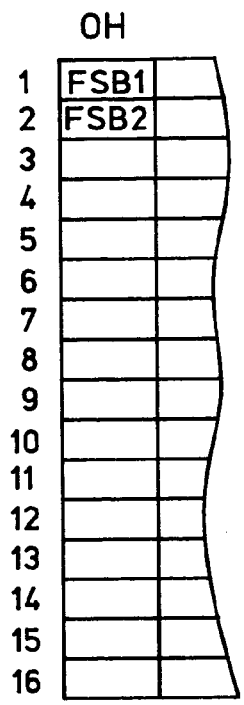
FIG. 6 is an example of node identifiers differentiated by the values of FSBs in the broadcast frame overhead section.
Figure 6:
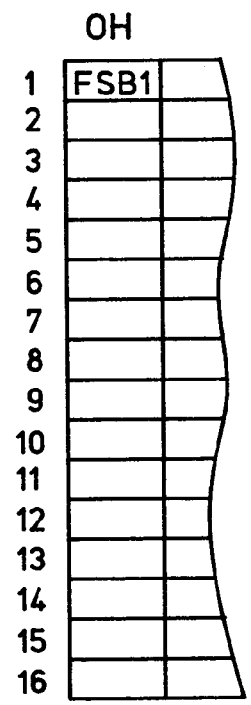
Figure 6:
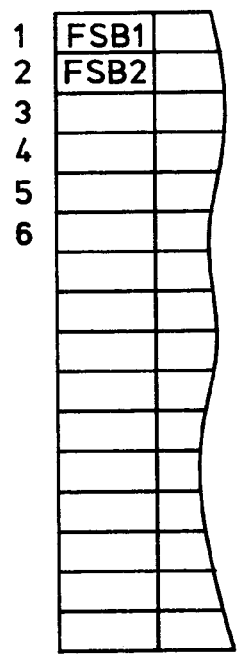
Figure 6:
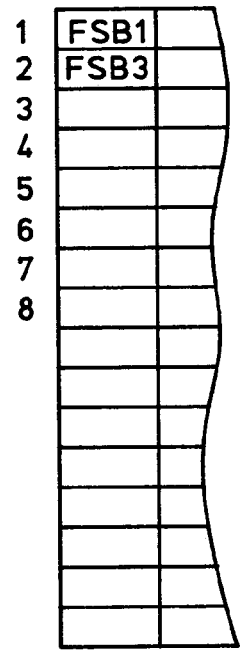

FIG. 6 is an example of node identifiers differentiated by the values of FSBs in the broadcast frame overhead section. A frame is broadcast with FSB1 and FSB2, where the two FSBs are of different value. A byte value is defined herein as the content of the byte, typically expressed as a BCD, such as "FF". At node 1, the FSB1 has been selected, and the frame is synchronized. At node two, FSB1 and FSB 2 have been selected. Because the broadcast frame overhead section includes the selected FSB values, the frame is synchronized at node two. Again, the frame can be considered to have been broadcast with both first and second node identifiers, where the first node identifier is associated with node one and the second node identifier with node two. However, node three has selected FSB1 and FSB3. Because the broadcast frame does not include FSB3, the frame is not synchronized at node three.

It should also be understood that the number of FSBs, the location of the FSBs, and the FSB values can be used simultaneously to create a wide variety of node identifiers. It should also be understood that the node identifier may include the selection of FSBs in more than one frame, such as multiple frames in a superframe. Further, the node identifiers may extend across a plurality of superframes.

Returning to FIG. 1, the overhead receiver 124 includes an input to acknowledge a node identifier for receiving the broadcast message. As explained above, this input is actually the inputs on lines 126, 130, and 134, as the node identifiers are created form the number, location, and value of the FSBs. The overhead receiver 124 acknowledges a node identifier for comparison to a node identifier in the overhead section of the broadcast frame.

The frame receiver 122 defines a frame having an overhead section with a first plurality of overhead section bytes, and the overhead receiver 124 selects frame synchronization bytes for comparison to frame synchronization bytes in the broadcast frame overhead section, where node identifiers are associated with frame synchronization bytes.

The overhead receiver 124 selects frame synchronization bytes to form the acknowledged node identifier. The received frame synchronization bytes are grouped, and then compared to the selected frame synchronization bytes. If the comparison is successful, the frame can be synchronized. Likewise, a node can be kept from synchronizing a frame if a frame is broadcast using a node identifier that does not match the identifier used at that particular node. As explained above, node identifiers are differentiated with respect to the number, location, and value of the selected FSBs. Further, node identifiers can be selected that use combinations of FSB number, locations, and values.

The overhead receiver 124 accepts commands to select a frame synchronization byte bit error rate (BER) on line 128. The overhead receiver 124 forms groups of received frame synchronization bytes having a bit error rate that is less than, or equal to, the selected bit error rate. Thus, synchronization is not only dependent upon selecting a node identifier, but also on selecting the BER. Returning to the example of FIG. 6, if the difference between FSB2 and FSB3 is two bit positions, and the overhead receiver is programmed to accept FSBs with errors in two bit positions, then node three will accept the broadcast frame. That is, the broadcast FSB2 will be recognized as FSB3. Thus, the use of BER can be considered as a means of making one node identifier serve as multiple node identifiers.

Returning to FIG. 2, it can be seen that a superframe includes a plurality of frame. Four frames are shown, but the present invention is not limited to any particular number of frames per superframe. Returning to FIG. 1, the frame generator 104 defines a superframe structure with a predetermined number of frames per superframe. Then, the overhead generator 106 selects frame synchronization byte values in the overhead section of each frame of the superframe. Likewise, the overhead receiver 124 recognizes frame synchronization bytes in each frame of the superframe. In some aspects of the invention, the overhead receiver 124 selects the number of frame synchronization bytes required for recognition, for each frame.

In some aspects of the invention, the frame generator 104 forms a superframe consisting of a first, second, third, and fourth frame, and the overhead generator 106 supplies a first frame synchronization byte value for the first frame, a second value for the second frame, a third byte value for the third frame, and a fourth byte value for the fourth frame. The first, second, third, and fourth byte values need not necessarily be different. Also, as explained below, each frame may include more than one FSB value. Typically, however, only the first frame includes FSB bytes, so that the overhead generator selects a second, third, and fourth number of byte values equal to zero. In the simple case, the frame receiver 122 forms a superframe consisting of a first, second, third, and fourth frame, and the overhead receiver 124 selects the first byte value for the first frame, the second byte value for the second frame, the third byte value for the third frame, and the fourth byte value for the fourth frame. Again, it is typical that the overhead receiver 124 selects a second, third, and fourth number of byte values equal to zero.

The overhead receiver 124 also selects the number of consecutive frames that must be recognized on line 138, and synchronizes the received superframe in response to the selected number of recognized frames. For example, the system may require that FSBs in two consecutive frames be identified, before a superframe is recognized. Likewise, the system may require that a plurality of consecutive superframes be recognized before synchronization occurs.

In some aspects of the invention, the overhead receiver 124 selects a number of bytes for each frame of the superframe, and recognizes the selected number of frame synchronization bytes in each frame of the superframe. For example, the overhead receiver 124 selects a first number of byte values for a first frame of the superframe, and synchronizes the first frame by recognizing the first number of byte values in the first frame of the superframe.

In a simple aspect of the invention, the overhead generator 106 selects a first number of frame synchronization byte values in the overhead section of a frame, and the overhead receiver 124 selects the first number of frame synchronization byte values required for recognition of the first frame. However, the overhead receiver need not select the all the FSBs that have been supplied by the overhead generator 106. For example, when the overhead generator supplies a first number of frame synchronization byte values for a first frame, the overhead receiver 124 can select a second number of byte values, less than the first number, for the first frame. The overhead receiver synchronizes the received frame in response to recognizing the second number of frame synchronization byte values in the first frame.

Further, the overhead generator 106 can supply a first number of FSBs in a first frame and a second number of FSBs in the second frame. The overhead receiver 124 can synchronize using the first number of FSB values in the first frame and the second number of FSBs in the second frame. However, as explained, the overhead receiver 124 is not required all the FSBs that are generated.

As noted above, the overhead receiver 124 has an input on line 128 to accept commands for selecting the bit error rate (BER) required for the recognition of a frame synchronization byte. For example, the overhead receiver 124 can select a number of permitted errors for each frame synchronization byte in the range from zero to a second plurality of bits, where each byte includes a second plurality of bits. Note that the BER can be independently set for different FSBs in a single frame. Likewise, the BER can be set for different values between frames, or between superframes. The BER can also be made to correspond to the FSB quantity and/or the FSB value. Regardless, the overhead receiver 124 recognizes frame synchronization bytes having a bit error rate less than, or equal to, the selected frame synchronization bit error rates. Of course, the overhead receiver 124 can be designed to recognize only frame synchronization bytes having a bit error rate that is less than the selected frame synchronization bit error rates.

In some aspects of the invention, the overhead receiver 124 accepts commands for selecting the location of the bytes on line 130 to be used for the frame synchronization of received frames. The overhead receiver 124 synchronizes the received frame in response to recognizing frame synchronization bytes in the selected locations. For example, the overhead receiver 124 selecting a first number of byte locations, and synchronizes the received frame in response to recognizing frame synchronization bytes in the first number of selected locations.

However, the frame locations can vary between frames, and between superframes. For example, the overhead receiver 124 selects a first number of FSB byte values in a first number of frames and a second number of FSB byte values in a second number of locations. Likewise, a first number of location can be selected in a first frame of the superframe, and a second number of locations in a second frame. The overhead receiver 124 synchronizes the received frame in response to recognizing frame synchronization bytes in the first number of selected locations in the first frame and the second number of selected locations in the second frame. Looking a FIG. 2 momentarily to refine the above-mentioned example, locations OH 1, OH 2, and OH 3 can be selected for the first frame, while locations OH 5, OH 6, and OH 7 can be selected for the second frame. This example would, of course, require the overhead generator 106 to supply FSBs in at least the above-mentioned byte locations.

In a simple aspect of the invention, the overhead generator 106 selects a first number of locations for a first number of frame synchronization bytes, in response to commands on line 132, and the overhead receiver 124 selects the first number of locations for the first number of frame synchronization bytes. However, the overhead receiver need not select all the location provided by the overhead generator 106. For example, the overhead generator 106 selects a first number of locations for a first number of frame synchronization bytes, and the overhead receiver 124 selects a second number of locations for a second number of frame synchronization bytes, less than the first number, and synchronizes the received frame in response to recognizing frame synchronization bytes in the second number of selected locations. Momentarily examining FIG. 2, the overhead generator 106 may supply FSBs in locations OH 1 through OH 6, while the overhead receiver selects locations OH 4 through OH 6 for use.

In some aspects of the invention, the overhead receiver accepts commands for selecting the values of each frame synchronization byte on line 134. The overhead receiver 124 synchronizes the received frame in response to recognizing the values of synchronization bytes. Typically, the FSB word is a byte of eight bits, although the invention is not limited to an FSB word of any particular length. With eight bit values, $2^8$ possible FSB values are possible for every FSB. Likewise, the FSB values may vary inside a frame. If a frame includes a first plurality, i.e., sixteen, overhead bytes, and sixteen FSBs are selected, then each of the sixteen FSBs may be the same byte value. On the other extreme, each FSB byte value may be different, and sixteen FSB values can be used in the frame. Thus, each frame can be synchronized using FSBs having different values.

In one aspect of the invention, the overhead receiver 124 selects first frame synchronization bytes having a first value and second frame synchronization bytes having a second value. Then, the overhead receiver 124 synchronizes the received frame in response to recognizing the first frame synchronization bytes having the first value and the second frame synchronization bytes having the second value. Although an example using two different FSB values is presented above, it is possible to have as many FSBs as there are rows in a frame. Thus, in the frame structure of FIG. 2, each frame could have a first plurality (sixteen in the example of FIG. 2) unique FSB values. Even more FSB values could be used if a greater portion of each row was devoted to the overhead section, at the expense of the payload or FEC sections.

Likewise, the value of the FSBs can change between frames. In some aspects of the invention, the overhead receiver 124 selects a first number of frame synchronization bytes having a first value in a first frame and a second number of frame synchronization bytes having a second value in a second frame. The overhead receiver synchronizes the received frame in response to recognizing the first number of frame synchronization bytes having the first value in the first frame and the second number of frame synchronization bytes having the second value in the second frame.

Alternately, multiple FSB values can be used in multiple frames. For example, the overhead receiver 124 selects a first number of frame synchronization bytes having a first value and a second number of frame synchronization bytes having a second value in a first and second frame. Then, the overhead receiver 124 synchronizes the frame in response to recognizing frame synchronization bytes having the first and second values in the first and second frames. In some aspects of the invention, the first FSB values are located in a first frame, and the second FSB values are located in a second frame.

In a simple aspect of the invention, the overhead generator 106 selects frame synchronization bytes having a first value, in response to commands on line 136, and the overhead receiver 124 selects frame synchronization bytes having the first value. However, the overhead receiver 124 need not select all the FSB values supplied by the overhead generator. For example, the overhead generator 106 selects a first number of frame synchronization bytes having a first value in a first number of locations and a second number of frame synchronization bytes in a second number of locations having a second value. The overhead receiver 124 selects a third number of frame synchronization bytes in a third number of locations, less than the first number, having the first value, and a fourth number of frame synchronization bytes in a fourth number of locations, less than the second number, having the second value. The overhead receiver 124 synchronizes the received frame in response to recognizing the third number of frame synchronization bytes having the first value in the third number of locations, and the fourth number of frame synchronization bytes having the second value in the fourth number of locations.

When the overhead receiver is not able to recognize FSBs, synchronization is lost. Once again, the way in which the system loses synchronization is programmable. The overhead receiver 124 accepts commands on line 140 for selecting a number of consecutive non-recognized frames. Then, the overhead receiver 124 falls out of synchronizing in response to the selected number of consecutively non-recognized frames.

Figure 7:
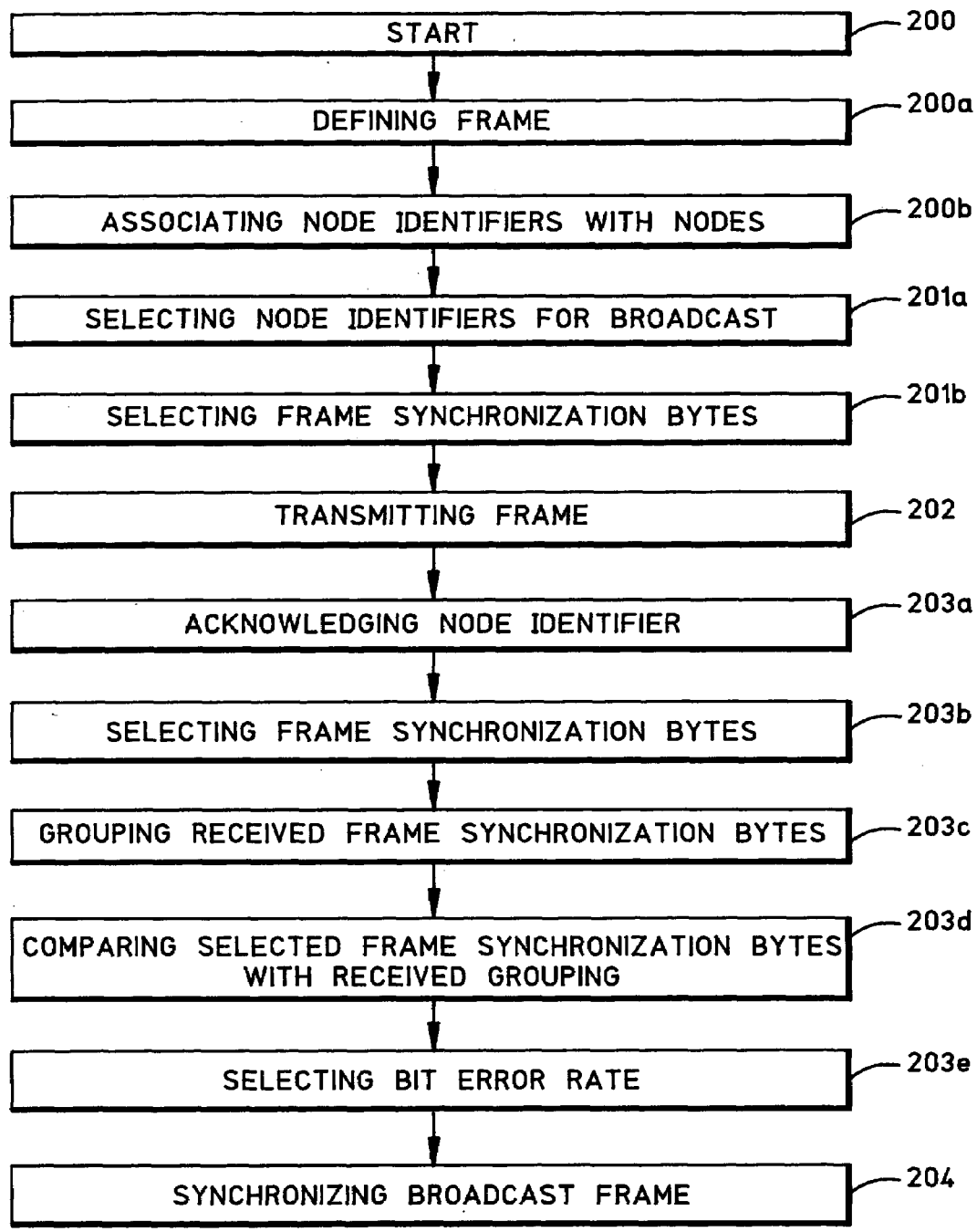
FIG. 7 is a flowchart depicting a method for selectively broadcasting in a multidimensional digital frame structure.

FIG. 7 is a flowchart depicting a method for selectively broadcasting in a multidimensional digital frame structure. Although the method is depicted as a sequence of numbered steps for clarity, no order should be inferred from the numbering unless explicitly stated. The method begins with Step 200. Step 202 transmits a frame with an overhead section including node identifiers. Step 204 synchronizes the broadcast frame in response to acknowledging the node identifiers.

Step 201*a* selects node identifiers for broadcast. Transmitting a frame with an overhead section including node identifiers in Step 202 includes broadcasting the selected node identifiers.

Step 200*a* defines a frame having an overhead section with a first plurality of overhead section bytes. Step 201*b* selects frame synchronization bytes for insertion into the broadcast frame overhead section. Selecting node identifiers in Step 201*a* includes using the selected frame synchronization bytes.

In some aspects of the invention, selecting node identifiers for broadcast in Step 201*a* includes selecting a plurality of node identifiers from a plurality of frame synchronization bytes.

In some aspects of the invention, synchronizing the broadcast frame in response to acknowledging the node identifiers in Step 204 includes receiving frames at a plurality of nodes in response to acknowledging the plurality of node identifiers.

Step 200*b* associates node identifiers with nodes. In some aspects, selecting node identifiers for broadcast in Step 201*a* includes selecting a first node identifier. Associating node identifiers with nodes in Step 200*b* includes associating the first node identifier with a first node. Synchronizing the frame in response to acknowledging the node identifiers in Step 204 includes synchronizing the frame at a first node in response to acknowledging the first node identifier.

In some aspects, associating node identifiers with nodes in Step 200*b* includes associating the first node identifier with a second node. Synchronizing the frame in response to acknowledging the node identifiers in Step 204 includes synchronizing the frame at the first and second nodes in response to acknowledging the first node identifier.

In some aspects, selecting node identifiers for broadcast in Step 201a includes selecting a second node identifier. Associating node identifiers with nodes in Step 200b includes associating the second node identifier with a second node. Synchronizing the frame in response to acknowledging the node identifiers in Step 204 includes synchronizing the frame at the first node in response to the first node identifier, and the second node in response to the second node identifier.

In some aspects of the invention, selecting node identifiers for broadcast from a plurality of frame synchronization bytes in Step 201a includes associating frame synchronization byte groups with node identifiers.

In some aspects, selecting frame synchronization bytes for insertion into the broadcast frame in Step 201b includes selecting the number of frame synchronization bytes in the overhead section. Selecting node identifiers by associating frame synchronization byte groups with node identifiers in Step 200b includes associating node identifiers with frame synchronization byte groups that are differentiated by quantity (number). In some aspects, selecting the number of frame synchronization bytes in the overhead section in Step 201b includes selecting frame synchronization bytes in the range from zero to the first plurality.

In some aspects of the invention, selecting frame synchronization bytes for insertion into the broadcast frame in Step 201b includes selecting the location of frame synchronization bytes in the overhead section. Selecting node identifiers by associating frame synchronization byte groups with node identifiers in Step 200b includes associating node identifiers with frame synchronization byte groups that are differentiated by location. In some aspects, selecting the location of frame synchronization bytes in the overhead section in Step 201b includes selecting frame synchronization bytes in the range from zero to a first plurality of locations.

In some aspects of the invention, selecting frame synchronization bytes for insertion into the broadcast frame in Step 201b includes selecting the value of frame synchronization bytes in the overhead section. Selecting node identifiers by associating frame synchronization byte groups with node identifiers in Step 200b includes associating node identifiers with frame synchronization byte groups that are differentiated by byte value. In some aspects, selecting the value of frame synchronization bytes in the overhead section in Step 201b includes selecting a second plurality of bits for each frame synchronization byte, where each byte includes a second plurality of bits.

Some aspects of the invention include further steps. Step 203a, at each node, acknowledges a node identifier. Step 203b selects frame synchronization bytes to form the acknowledged node identifier. Step 203c groups received frame synchronization bytes. Step 203d compares the selected frame synchronization bytes with the received grouping of frame synchronization bytes.

Step 203e selects a frame synchronization byte bit error rate. Step 203c groups frame synchronization bytes includes grouping frame synchronization bytes having a bit error rate that is less than, or equal to, the selected bit error rate.

In some aspects of the invention, selecting a frame synchronization byte bit error rate in Step 203e includes selecting a number of permitted errors for each frame synchronization byte in the range from zero to the second plurality of errors, where each frame synchronization byte includes a second plurality of bits.

In some aspects, selecting frame synchronization bytes in Step 203b includes selecting a group of frame synchronization bytes differentiated by quantity. Selecting frame synchronization bytes in Step 203b also includes selecting a group of frame synchronization bytes differentiated by byte location. Selecting frame synchronization bytes in Step 203b includes selecting a group frame synchronization bytes differentiated by byte value.

Figure 8:
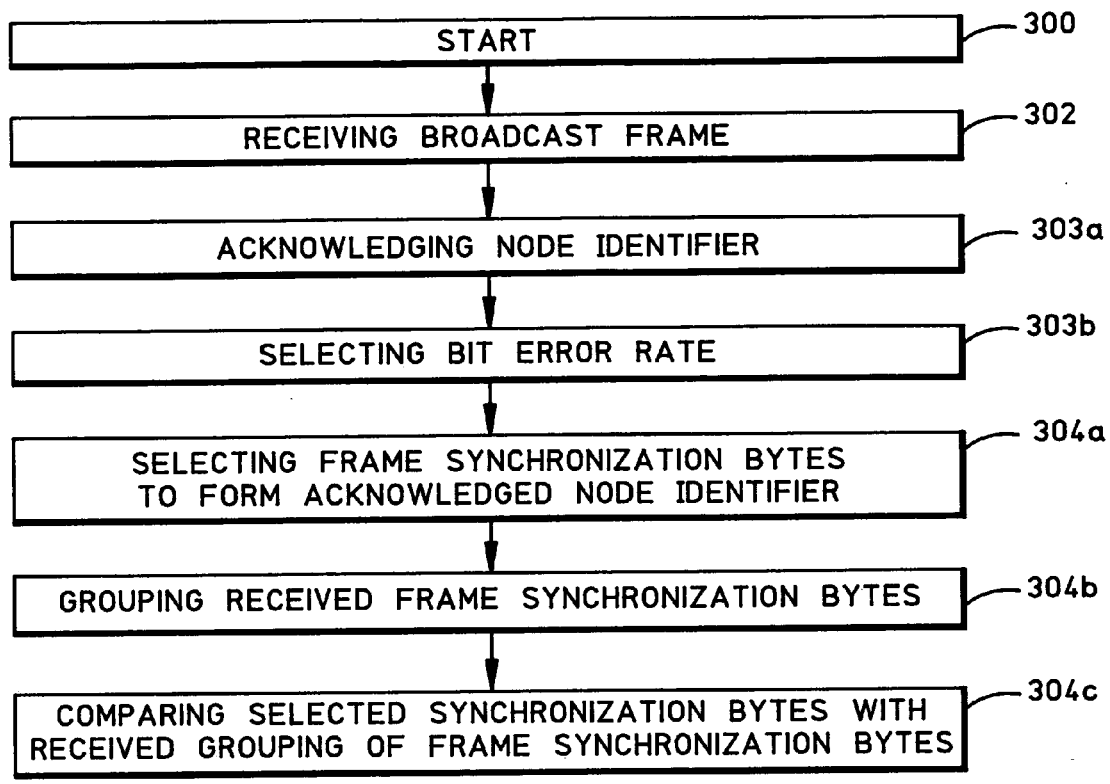
FIG. 8 is a flowchart depicting a method for selectively receiving a broadcast message in a multidimensional digital frame structure.

FIG. 8 is a flowchart depicting a method for selectively receiving a broadcast message in a multidimensional digital frame structure. The method begins with Step 300. Step 302 receives a broadcast frame with an overhead section including node identifiers. Step 304 synchronizes the broadcast frame in response to acknowledging the node identifiers.

Step 303a, at each node, acknowledges a node identifier. Synchronizing the broadcast frame in Step 304 includes sub-steps. Step 304a selects frame synchronization bytes to form the acknowledged node identifier. Step 304b groups received frame synchronization bytes. Step 304c compares the selected frame synchronization bytes with the received grouping of frame synchronization bytes. In some aspects, acknowledging a node identifier in Step 304 includes selecting a node identifier from a plurality of node identifiers. In some aspects, Step 303a receives a broadcast frame with a node identifier.

In some aspects, Step 302 receives a broadcast frame with a first mode identifier. Acknowledging a node identifier in Step 303a includes a first node acknowledging a first node identifier. Synchronizing the broadcast frame in response to acknowledging the node identifiers in Step 304 includes synchronizing the broadcast frame at the first node in response to the first node identifier.

In some aspects, acknowledging a node identifier in Step 303a includes a second node acknowledging a first node identifier. Synchronizing the broadcast frame in response to acknowledging the node identifiers in Step 304 includes synchronizing the broadcast frame at the first and the second node in response to the first node identifier.

In some aspects, Step 302 receives a broadcast frame with a first and second node identifier. Acknowledging a node identifier in Step 303a includes a second node acknowledging a second node identifier. Synchronizing the broadcast frame in response to acknowledging the node identifiers in Step 304 includes synchronizing the broadcast frame at the first node in response to the first node identifier and at the second node in response to the second node identifier.

In some aspects, selecting frame synchronization bytes to form the acknowledged node identifier in Step 304a includes selecting a group of frame synchronization bytes differentiated by quantity. Selecting frame synchronization bytes to form the acknowledged node identifier in Step 304a includes selecting a group of frame synchronization bytes differentiated by byte location. Selecting frame synchronization bytes to form the acknowledged node identifier in Step 304a also includes selecting a group of frame synchronization bytes differentiated by byte value.

Some aspects of the invention include further steps. Step 303b selects a frame synchronization byte bit error rate. Grouping frame synchronization bytes in Step 304b includes grouping frame synchronization bytes having a bit error rate that is less than, or equal to, the selected bit error rate.

In some aspects, selecting a frame synchronization byte bit error rate in Step 303b includes selecting a number of permitted errors for each frame synchronization byte in the range from zero to the second plurality of errors, where each frame synchronization byte includes a second plurality of bits.

An example of the above, broadly-stated, invention is presented below. The typical frame structure uses a 255-byte FEC code as the basic building block which is referred to as a subframe, or row. Each subframe is defined by a Reed-Solomon (RS) codec that is intended to provide 8 byte correction capability over the 255-byte block. This codec is referred to as RS(255,239) for 8 byte correction.

Figure 9:
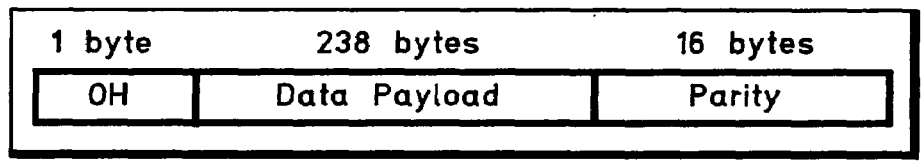
FIG. 9 is an example of a subframe consisting of a 255-byte RS(255,239) block with an overhead (OH) byte as the first byte, followed by 238 user payload bytes, and 16 bytes of RS parity.

FIG. 9 is an example of a subframe consisting of a 255-byte RS(255,239) block with an overhead (OH) byte as the first byte, followed by 238 user payload bytes, and 16 bytes of RS parity. The OH byte may be used as a Frame Synchronization Byte (FSB) or other programmable function.

Figure 10:
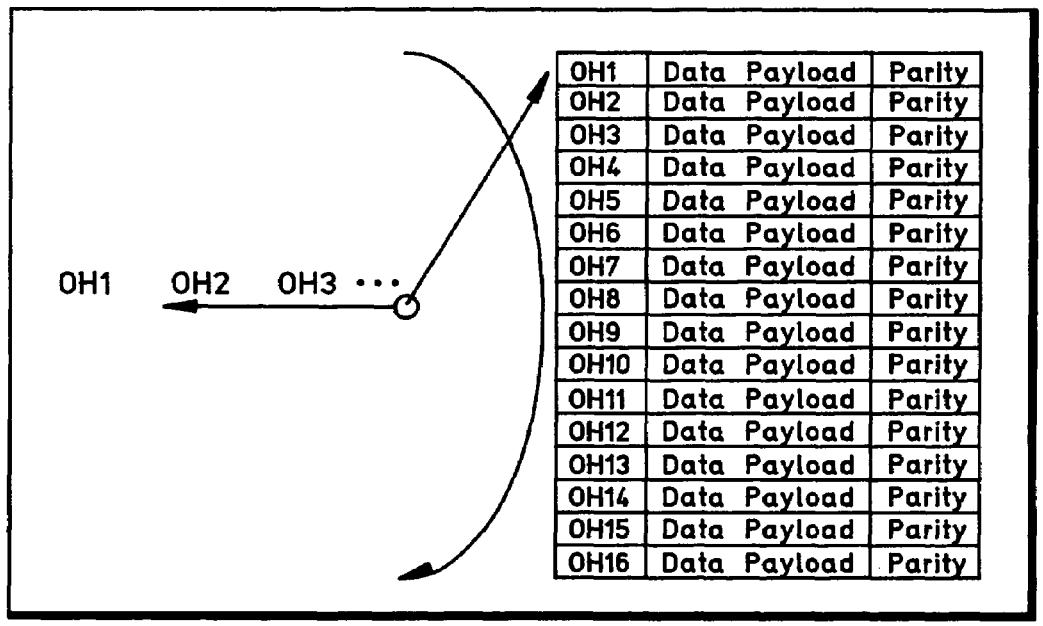
FIG. 10 illustrates the stacking of subframes in a frame.

FIG. 10 illustrates the stacking of subframes in a frame. The subframes are stacked in a structure that is 16 deep to create a frame as shown in FIG. 2. The bytes are transmitted in an interleaved fashion from top to bottom and left to right. Four frames are used to create a superframe as shown in FIG. 2. A superframe contains 64 overhead locations. The frames are transmitted in order from frame 1 to frame 4.

The first frame in the superframe is the one that traditionally contains frame synchronization bytes. The user may select to have two different FSB types (FSB1 and FSB2). The ability to have two different FSBs and the ability to program them with custom values provide the user added control over their system both in terms of resistance to false synchronization and the ability to distinguish different data sources from each other. This is useful when there are multiple wavelengths that can be received, all carrying the same frame structure, but only one of which is allowed/ permissioned to be received at a particular node. Table 1 provides an example of how the FSB types are defined.

The FSBs are also programmable in number. In Frame 1, OH 1 to OH 16 can be programmed to be FSB1, FSB2, or a non-FSB function. This expands on the variability afforded by having two different FSBs. By using more of the available bandwidth for FSBs, the user decreases the chance of false synchronization and in general, decreases the amount of time required to acquire synchronization. The user can customize this parameter to optimize for specific requirements and link conditions.

Table 2 demonstrates the structure required to indicate which OH bytes are used for FSBs and Table 3 illustrates the structure that sets whether to use FSB1 or FSB2. The FSB programmability exists independently in both the transmit and receive portions of the device. In the receive section of the device, the number of recognized consecutive FSB groups required to declare synchronization is programmable, as well as the number of bad consecutive FSB groups required to lose synchronization. This is the first level of thresholding for adjusting the tolerance to bit error rate and the amount of time required to declare synchronization. Table 4 is an example of synchronization parameter setting. The fewer consecutive FSB groups required to achieve synchronization, the shorter the acquisition time. The more consecutive bad FSB groups required to lose synchronization, the greater the system tolerant of higher bit error rates.

The second level of thresholding is to define what is considered a good group of FSBs vs. a bad group of FSBs. This is done by specifying the number of errors that are allowed within a group of FSBs and still be considered good as shown in Table 4. This feature has the advantage of decreasing synchronization time in the presence of high bit error rates. Longer FSB groups are permitted which decrease the probability of false synchronization, without incurring the penalty of difficult synchronization in the presence of noise. Further, the FEC code is given greater opportunity to correct errors.

Another benefit of the second level of thresholding is the ability to dynamically customize the values of the FSBs. This thresholding provides network security, and dynamically allocates more bytes for synchronization based on the link conditions, without causing a resynchronization to occur.

TABLE 1

Frame Synchronization Byte Definitions

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | | | | FSB 2 | | | | | | | | FSB 1 | | | | |
| Mode | rw | rw | rw | rw | rw | rw | rw | rw | rw | rw | rw | rw | rw | rw | rw | rw |
| Default | 0 | 0 | 1 | 0 | 1 | 0 | 0 | 0 | 1 | 1 | 1 | 1 | 0 | 1 | 1 | 0 |

| Bit Positions | Function | Description |
|---|---|---|
| 15:8 | FSB 2 | Frame Synchronization Byte 2 (Default value = 28 h) |
| 7:0 | FSB 1 | Frame Synchronization Byte 1 (Default value = F6 h) |

Accommodations are made for two separate frame synchronization bytes.

TABLE 2

Frame Synchronization Byte Locations Register

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | OH #1 | OH #2 | OH #3 | OH #4 | OH #5 | OH #6 | OH #7 | OH #8 | OH #9 | OH #10 | OH #11 | OH #12 | OH #13 | OH #14 | OH #15 | OH #16 |
| Mode | rw | rw | rw | rw | rw | rw | rw | rw | rw | rw | rw | rw | rw | rw | rw | rw |
| Default | 1 | 1 | 1 | 1 | 1 | 1 | 0 | 0 | 0 | 0 | 0 | 0 | 0 | 0 | 0 | 0 |

| Bit Positions | Function | Description |
|---|---|---|
| 15 | OH#1 | 0: Not a Frame Synchronization Byte<br>1: Frame Synchronization Byte (FSB) (Default) |
| 14 | OH#2 | 0: Not a Frame Synchronization Byte<br>1: Frame Synchronization Byte (FSB) (Default) |
| 13 | OH#3 | 0: Not a Frame Synchronization Byte<br>1: Frame Synchronization Byte (FSB) (Default) |
| 12 | OH#4 | 0: Not a Frame Synchronization Byte<br>1: Frame Synchronization Byte (FSB) (Default) |
| 11 | OH#5 | 0: Not a Frame Synchronization Byte<br>1: Frame Synchronization Byte (FSB) (Default) |
| 10 | OH#6 | 0: Not a Frame Synchronization Byte<br>1: Frame Synchronization Byte (FSB) (Default) |
| 9 | OH#7 | 0: Not a Frame Synchronization Byte (Default)<br>1: Frame Synchronization Byte (FSB) |
| 8 | OH#8 | 0: Not a Frame Synchronization Byte (Default)<br>1: Frame Synchronization Byte (FSB) |
| 7 | OH#9 | 0: Not a Frame Synchronization Byte (Default)<br>1: Frame Synchronization Byte (FSB) |
| 6 | OH#10 | 0: Not a Frame Synchronization Byte (Default)<br>1: Frame Synchronization Byte (FSB) |
| 5 | OH#11 | 0: Not a Frame Synchronization Byte (Default)<br>1: Frame Synchronization Byte (FSB) |
| 4 | OH#12 | 0: Not a Frame Synchronization Byte (Default)<br>1: Frame Synchronization Byte (FSB) |
| 3 | OH#13 | 0: Not a Frame Synchronization Byte (Default)<br>1: Frame Synchronization Byte (FSB) |
| 2 | OH#14 | 0: Not a Frame Synchronization Byte (Default)<br>1: Frame Synchronization Byte (FSB) |
| 1 | OH#15 | 0: Not a Frame Synchronization Byte (Default)<br>1: Frame Synchronization Byte (FSB) |
| 0 | OH#16 | 0: Not a Frame Synchronization Byte (Default)<br>1: Frame Synchronization Byte (FSB) |

This table defines which of the overhead bytes (1–16) are going to be used as FSBs.

TABLE 3

Frame Synchronization Byte Types

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | OH #1 | OH #2 | OH #3 | OH #4 | OH #5 | OH #6 | OH #7 | OH #8 | OH #9 | OH #10 | OH #11 | OH #12 | OH #13 | OH #14 | OH #15 | OH #16 |
| Mode | rw | rw | rw | rw | rw | rw | rw | rw | rw | rw | rw | rw | rw | rw | rw | rw |
| Default | 0 | 0 | 0 | 1 | 1 | 1 | 0 | 0 | 0 | 0 | 0 | 0 | 0 | 0 | 0 | 0 |

NOTE: If an OH byte is not defined to be an FSB in the Decoder Frame Synchronization Byte Locations Register, the corresponding bit in this register has no significance.

| Bit Positions | Function | Description |
|---|---|---|
| 15 | OH#1 | 0: FSB 1 (Default)<br>1: FSB 2 |
| 14 | OH#2 | 0: FSB 1 (Default)<br>1: FSB 2 |
| 13 | OH#3 | 0: FSB 1 (Default)<br>1: FSB 2 |
| 12 | OH#4 | 0: FSB 1<br>1: FSB 2 (Default) |
| 11 | OH#5 | 0: FSB 1<br>1: FSB 2 (Default) |
| 10 | OH#6 | 0: FSB 1<br>1: FSB 2 (Default) |
| 9 | OH#7 | 0: FSB 1 (Default)<br>1: FSB 2 |
| 8 | OH#8 | 0: FSB 1 (Default)<br>1: FSB 2 |
| 7 | OH#9 | 0: FSB 1 (Default) |

TABLE 3-continued

Frame Synchronization Byte Types

| | | |
|---|---|---|
| | | 1: FSB 2 |
| 6 | OH#10 | 0: FSB 1 (Default) |
| | | 1: FSB 2 |
| 5 | OH#11 | 0: FSB 1 (Default) |
| | | 1: FSB 2 |
| 4 | OH#12 | 0: FSB 1 (Default) |
| | | 1: FSB 2 |
| 3 | OH#13 | 0: FSB 1 (Default) |
| | | 1: FSB 2 |
| 2 | OH#14 | 0: FSB 1 (Default) |
| | | 1: FSB 2 |
| 1 | OH#15 | 0: FSB 1 (Default) |
| | | 1: FSB 2 |
| 0 | OH#16 | 0: FSB 1 (Default) |
| | | 1: FSB 2 |

TABLE 4

Decoder Framing Controls

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | Check to go In-Frame | | | | Check to go Out-of-Frame | | | | Unused | | | FSB Errors Allowed | | | | |
| Mode | rw | rw | rw | rw | rw | rw | rw | rw | ro | ro | rw | rw | rw | rw | rw | rw |
| Default | 0 | 0 | 1 | 0 | 0 | 1 | 0 | 0 | 0 | 0 | 0 | 0 | 1 | 0 | 0 | 0 |

| Bit Positions | Function | Description |
|---|---|---|
| 15:12 | Check to go In-Frame | Number of correct consecutive FSB groups required to go In-Frame. (Default value = 2) |
| 11:8 | Check to go Out-of-Frame | Number of incorrect consecutive FSB groups required to go Out-of-Frame. (Default value = 4) |
| 7:5 | Unused | |
| 5:0 | FSB Errors Allowed | The total number of erred bits allowed in a group of FSBs to still consider a match. (Default value = 8). This number is used regardless of the synchronization state (In-Frame or Out-of-Frame). |

Table 4 sets the synchronization thresholding parameters.

A system and method have been provided that illustrate the advantages of providing selectable communication links in a network broadcast. The invention can fully customize the synchronization methodology, to optimize robustness to noise and synchronization time. The invention specifically illustrates an example using different FSB values, different numbers of FSBs, different FSB locations, programmable gain synchronization, programmable lose synchronization parameters, and programmable bit error tolerance within the FSBs themselves. However, the invention is not limited to an particular configuration of FSBs, or any specific framing structure. Node identifiers can be made using combinations of the selectable FSB numbers, locations, and values. The invention permits users to create different networks that are logically separated from each other so that receivers can easily distinguish between different data sources. Other variations and embodiments of the invention will occur to those skilled in the art.

We claim:

1. In a multidimensional digital frame structure, a system for selectively broadcasting, the method comprising:
   a frame generator including an overhead generator to generate the overhead section of a frame, a payload generator to generate the payload section of the frame, and an encoder to provide forward error correction (FEC) for the frame; and wherein the overhead generator includes an input to select node identifiers for insertion into the overhead section.

2. The system of claim 1 wherein the frame generator defines a frame having an overhead section with a first plurality of overhead section bytes;
   wherein the overhead generator selects frame synchronization bytes for insertion into the broadcast frame overhead section, where node identifiers are selected in response to the frame synchronization bytes.

3. The system of claim 2 wherein the overhead generator selects a plurality of node identifiers from a plurality of frame synchronization bytes.

4. The system of claim 3 wherein the overhead generator selects frame synchronization byte groups associated with node identifiers.

5. The system of claim 4 wherein the payload generator generates a message intended for a first node; and
   wherein the overhead generator selects the first node identifier and inserts the frame synchronization bytes associated with the first node into the broadcast frame overhead section.

6. The system of claim 4 wherein the payload generator generates a message addressed to a first and a second node; and wherein the overhead generator selects the first and second node identifiers, and inserts the frame synchronization bytes associated with the first and second node identifiers into the broadcast frame overhead section.

7. The system of claim 4 wherein the overhead generator selects the number of frame synchronization bytes in the overhead section, where node identifiers are associated with frame synchronization byte groups that are differentiated by quantity.

8. The method of claim 7 wherein the overhead generator selects the quantity of frame synchronization bytes in the range from zero to the first plurality.

9. The system of claim 4 wherein the overhead generator selects the location of frame synchronization bytes in the overhead section, where node identifiers are associated with frame synchronization byte groups that are differentiated by byte location.

10. The system of claim 9 wherein the overhead generator selects frame synchronization byte locations in the range from zero to a first plurality of locations.

11. The system of claim 4 wherein the overhead generator selects the value of frame synchronization bytes in the overhead section, where node identifiers are associated with frame synchronization byte groups that are differentiated by byte value.

12. The system of claim 11 wherein the overhead generator selects a second plurality of bits for each frame synchronization byte, where each byte includes a second plurality of bits.

13. In a multidimensional digital frame structure, a system for selectively receiving a broadcast message, the system comprising:
a frame receiver including an overhead receiver to receive the overhead section of a frame, a payload receiver to receive the payload section of the frame, and a decoder to provide a forward error corrected (FEC) frame; and
wherein the overhead receiver includes an input to acknowledge a node identifier for synchronizing the broadcast message.

14. The system of claim 13 wherein the overhead receiver acknowledges a node identifier for comparison to a node identifier in the overhead section of the broadcast frame.

15. The system of claim 14 wherein the frame receiver defines a frame having an overhead section with a first plurality of overhead section bytes; and
wherein the overhead receiver selects frame synchronization bytes for comparison to frame synchronization bytes in the broadcast frame overhead section, where node identifiers are associated with frame synchronization bytes.

16. The system of claim 15 wherein the overhead receiver selects frame synchronization bytes to form the acknowledged node identifier; and
wherein the overhead receiver groups received frame synchronization bytes, and compares the selected frame synchronization bytes with the received grouping of frame synchronization bytes.

17. The system of claim 16 wherein the overhead receiver acknowledges a node identifier from a plurality of node identifiers.

18. The system of claim 17 wherein the overhead receiver acknowledges a first node identifier; and
wherein the frame receiver synchronizes the broadcast frame in response to the overhead receiver acknowledging the first node identifier.

19. The system of claim 18 wherein the overhead receiver acknowledges a second node identifier; and
wherein the frame receiver does not synchronize the broadcast frame in response to the overhead receiver acknowledging the second node identifier.

20. The system of claim 17 wherein the overhead receiver acknowledges a node identifier by selecting frame synchronization bytes to form a group of frame synchronization bytes, differentiated from other frame synchronization byte groups by quantity.

21. The system of claim 20 wherein the overhead receiver acknowledges a node identifier by selecting frame synchronization bytes to form a group of frame synchronization bytes, differentiated from other frame synchronization byte groups by byte location.

22. The system of claim 20 wherein the overhead receiver acknowledges a node identifier by selecting frame synchronization bytes to form a group of frame synchronization bytes, differentiated from other frame synchronization byte groups by byte value.

23. The system of claim 20 wherein the overhead receiver selects a frame synchronization byte bit error rate; and
wherein the overhead receiver forms groups of received frame synchronization bytes having a bit error rate that is less than, or equal to, the selected bit error rate.

* * * * *

UNITED STATES PATENT AND TRADEMARK OFFICE
CERTIFICATE OF CORRECTION

PATENT NO. : 6,931,006 B1  Page 1 of 1
APPLICATION NO. : 09/745793
DATED : August 16, 2005
INVENTOR(S) : Bendak et al.

It is certified that error appears in the above-identified patent and that said Letters Patent is hereby corrected as shown below:

IN THE CLAIMS

Claim 1, line 62, change "method" to --system--.

Claim 8, line 10, change "method" to --system--.

Signed and Sealed this

Eighteenth Day of March, 2008

JON W. DUDAS
*Director of the United States Patent and Trademark Office*

UNITED STATES PATENT AND TRADEMARK OFFICE
CERTIFICATE OF CORRECTION

PATENT NO. : 6,931,006 B1
APPLICATION NO. : 09/745793
DATED : August 16, 2005
INVENTOR(S) : Bendak et al.

Page 1 of 1

It is certified that error appears in the above-identified patent and that said Letters Patent is hereby corrected as shown below:

IN THE CLAIMS

Column 17, Claim 1, line 62, change "method" to --system--.

Column 19, Claim 8, line 10, change "method" to --system--.

This certificate supersedes the Certificate of Correction issued March 18, 2008.

Signed and Sealed this

Fifteenth Day of April, 2008

JON W. DUDAS
*Director of the United States Patent and Trademark Office*